United States Patent
Sestanj

[15] 3,682,963
[45] Aug. 8, 1972

[54] DIMETHYLBENZODITHIAN-2-OXIDE

[72] Inventor: Kazimir Sestanj, 605 B. Havre Des Iles St., Chomedey, Laval, Canada

[22] Filed: July 6, 1970

[21] Appl. No.: 52,776

[52] U.S. Cl. ............................260/327 R, 424/277
[51] Int. Cl. ........................A61k 27/00, C07d 73/00
[58] Field of Search .................................260/327 R

[56] References Cited

OTHER PUBLICATIONS

Luttringhaus, et al., Angew Chem. 67:304 (1955)

*Primary Examiner*—Henry R. Jiles
*Assistant Examiner*—Cecilia M. Shurko
*Attorney*—Andrew Kafko, Dwight J. Potter and Joseph Martin Weigman

[57] ABSTRACT

There is disclosed herein 6,7-dimethyl-2,3-benzodithian-2-oxide and an anti-fungal and cholesterol-lowering agent. A method for preparing and methods for using the compound are also disclosed.

1 Claim, No Drawings

3,682,963

DIMETHYLBENZODITHIAN-2-OXIDE

BACKGROUND OF THE INVENTION

This invention relates to 6,7-dimethyl-2,3-benzodithian-2-oxide of the formula I

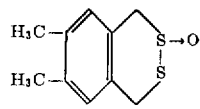

The compound of this invention is distinguished by possessing an exceptionally high degree of anti-fungal activity and by cholesterol-lowering activity.

Closely related derivatives of 1,2-dithiane are known. For example, 1,2-dithian-2-oxide has been described in U.S. Pat. No. 2,508,745; 2,3-benzodithian-2-oxide has been described by Lüttringhaus and Hägele in Angew. Chem. 67, p. 304 (1955); German Pat. No. 1,060,655 describes certain derivatives of naphtho-1,4-dithiin; methyl-substituted 2,3-dithian-2-oxides have been described by Isenberg in his dissertation (1963) Univ. Microfilms 64-5978; and 5,6-dihydroxy-2,3-dithiane has been described by Cleland in Biochemistry 3, p. 480 (1964). Moreover, I have also prepared 6,7-dimethoxy-2,3-benzodithian-2-oxide, 2,3-benzodithiane, 6,7-dimethyl-2,3-benzodithiane, and 1,4-dihydronaphtho[2,3-d]-o-dithiin-2-oxide and have found that none of the above compounds shows the remarkably high anti-fungal activity exhibited by the compound of this invention.

SUMMARY OF THE INVENTION

The compound of this invention is conveniently obtained from the corresponding o-bis(mercaptomethyl) derivative of the formula II by treatment with a mild oxidizing agent, preferably ferric chloride, to obtain the corresponding 2,3-dithiane derivative of the formula III. Said last-named compound is then treated with a more powerful oxidizing agent, preferably an organic peracid such as m-chloroperbenzoic acid, or with hydrogen peroxide, to yield the corresponding 2,3-dithian-2-oxide. The starting material of formula II is conveniently prepared from the corresponding o-chloromethyl derivatives by treatment with thiourea followed by ammonia and followed by treatment with a mineral acid, preferably hydrochloric acid, or by treatment with potassium thioacetate and acid hydrolysis. In some cases concerning the preparation of related compound for purposes of comparison, the preparation of the starting material of formula II may be combined in a single step with the preparation of the corresponding 2,3-dithiane derivative of formula III. In all cases the final products of formula I are conveniently isolated by evaporation of the solvent and may be purified by crystallization.

The following formulas will illustrate this invention.

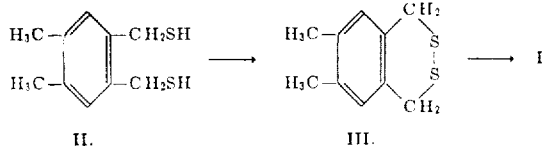

DETAILED DESCRIPTION OF THE INVENTION

More specifically, 1,2-di(mercaptomethyl)-4,5-dimethyl-benzene (II), prepared as described by Shahak and Bergmann in J. Chem. Soc. (C) 1966, p. 1005, is treated in solution in a solvent, preferably glacial acetic acid, with ferric chloride, to yield 6,7-dimethyl-2,3-benzodithiane (III). Treatment of said last-named compound with m-chloroperbenzoic acid in solution in a solvent, preferably chloroform at temperatures of from -20° to 10° C, yields 6,7-dimethyl-2,3-benzodithian-2-oxide (I). Similarly, 1,2-di(chloromethyl)-4,5-dimethoxy-benzene, prepared as described by Wood, Perry, and Tung in J. Am. Chem. Soc., 72, p. 2989 (1950) is treated with thiourea, preferably at an elevated temperature such as the reflux temperature of the mixture and followed by treatment with ammonia. Acidification yields 1,2-di(mercaptomethyl)-4,5-dimethoxybenzene, and treatment of said last-named compound with ferric chloride in the same manner as described above yields 6,7-dimethoxy-2,3-benzodithiane. Treatment of said last-named compound with m-chloroperbenzoic acid in the same manner as described above yields 6,7-dimethoxy-2,3-benzodithian-2-oxide. Again in a similar manner, 2,3-bis(chloromethyl)1,4-naphthoquinone, prepared as described by R.H. Thomson in J. Chem. Soc. 1953, p. 1196, is treated with potassium thioacetate to yield 2,3-bis(mercaptomethyl)-1,4-naphthoquinone diacetate which is in turn treated with ferric chloride in glacial acetic acid and in the presence of hydrochloric acid. In this manner, hydrolysis of the acetate groups and oxidation of the resulting di(mercaptomethyl) derivative are achieved in a single step, and 1,4-dihydronaphtho[2,3-d]-o-dithiin-5,10-dione is obtained. Said last-named compound is treated with m-chloroperbenzoic acid in the same manner as described above to yield 1,4-dihydronaphtho-[2,3-d]-o-dithiin-5,10-dion-2-oxide. 4,5-Dihydroxy-2,3-dithian-2-oxide is obtained in the same manner from 4,5-dihydroxy-2,3-dithiane.

The compound of this invention 6,7-dimethyl-2,3-benzodithian-2-oxide has been found to possess interesting pharmacological properties. More particularly, this compound, when tested in standard pharmacological tests, for example, in a procedure such as described in Antiseptics, Disinfectants, Fungicides and Chemical and Physical Sterilization, Lea and Febiger, Philadelphia 1957 for the determination of anti-fungal activity has exhibited an exceptionally high degree of activity against pathogenic fungi such as Candida albicans, Trichophyton granulosum, and Microsporum gypseum, and is useful as an anti-fungal agent for topical application. As such, it may be formulated as solutions, creams, or lotions with pharmaceutically acceptable vehicles such as described, for example in Remington's Practice of Pharmacy, Mack Publishing Co., Easton, Pa., such formulations to contain from 0.1 to 1.0 percent of the active ingredient and to be applied topically to infected areas of the skin from one to four times daily as required.

When considering the close relationship of the compound of this invention to the compounds described above and to certain reference compounds known from the literature it is all the more surprising and unexpected that 6,7-dimethyl-2,3-benzodithian-2-oxide should possess the exceptionally high degree of antifungal activity against certain pathogenic fungi shown in the following table. The activities of the reference compounds is also given in the following table, and it will be seen that the compound of this invention is from 4 to 16,000 times more active.

Minimum Inhibitory Concentration, mcg/ml

| Compound | Candida albicans | Trichophyton granulosum | Microsporum gypseum |
| --- | --- | --- | --- |
| 6,7-Dimethyl-2,3-benzo-dithian-2-oxide | 0.0625–0.5 | 0.0625 | 4 |
| 6,7-Dimethoxy-2,3-benzo-dithian-2-oxide | 500 | 250 | 250 |
| 6,7-Dimethyl-2,3-benzo-dithiane | 1000 | 1000 | 1000 |
| 2,3 Benzodithian(1) | 125 | 32 | 16 |
| 1,4-Dihydronaphtho[2,3-d]-o-dithiin-5,10-dion-2-oxide | 62.5 | 16 | 16 |
| 2,3-Benzodithian-2-oxide (1) | 125 | 125 | 250 |
| 4,5-Dihydroxy-2,3-dithian-2-oxide | 500 | 1000 | >1000 |

(1)Luttringhaus and Hagele loc. cit.

Furthermore, this compound, in standard pharmacological tests for example, in a procedure similar to that described by M. Kraml et al., J. Med. Chem., 7, 500 (1964) for the testing of agents affecting cholesterol concentrations in the blood serum, has exhibited activities as cholesterol lowering agent.

When the compound of this invention is employed as a cholesterol lowering agent in warm-blooded animals, e.g. in rats, alone or in combination with pharmacologically acceptable carriers, the dosage of the compound and the proportion of carriers is determined by the solubility and chemical nature of the compound, by the chosen route of administration and by standard biological practice. For example, the compound may be administered orally in solid form containing such excipients as starch, lactose, certain types of clay, lubricants such as magnesium stearate, and similar ingredients. It may also be administered orally in the form of solutions, or it may be injected parenterally. For parenteral administration the compound of this invention may be administered in the form of sterile solutions containing other solutes, for example, sodium chloride or glucose to make the solution isotonic.

The dosage of the compound of this invention will vary with the form of administration as well as with the particular host under treatment. Generally, treatment is initiated with small dosages substantially less than the optimum dose of the compound. Thereafter, the dosage is increased by small increments until the optimum effect under the circumstances is reached.

In general, the compound of this invention is most desirably administered at a concentration dosage level which will generally afford effective results without causing any harmful side effects, and preferably at a level that is in a range of from about 5 mg to about 100 mg per kilo body weight per day, although certain variations will occur as noted above. However, a dosage level in which the range is about 25 mg to about 50 mg per kilo body weight per day is most desirably employed in order to achieve effective results.

The following Example will illustrate this invention.

EXAMPLE 1

A solution of 1,2-di(mercaptomethyl)-4,5-dimethylbenzene (10 g, 0.051 mole), in methanol and glacial acetic acid (500 ml, 1:1) is added dropwise over 3 hours to a stirred solution of ferric chloride (20 g, 0.123 mole, anhydrous) in 120 ml of methanol and 50 ml of glacial acetic acid. The product is precipitated by addition of 2,000 ml of water, filtered and crystallized from ethanol, to yield 6,7-dimethyl-2,3-benzodithiane, m.p. 00-100° C.

A solution of m-chloroperbenzoic acid (17 g, 0.076 mole, 76%) in 500 ml of chloroform is added dropwise over 30 minutes to a cooled (ice bath), stirred solution of 6,7-dimethyl-2,3-benzo-dithiane (15 g, 0.076 mole) in 750 ml of chloroform. The ice bath is removed and stirring is continued at room temperature for an additional 20 minutes. The solution is washed with 130 ml of 5 percent sodium bicarbonate and water to neutrality and dried over anhydrous magnesium sulfate. Evaporation of the solvent and crystallization from benzene yields 6,7-dimethyl-2,3-benzodithian-2-oxide, m.p. 175°–177° C after crystallization from benzene.

In a similar manner, using as starting materials 1,2-bis(chloromethyl)-4,5-dimethoxybenzene, converting it to the corresponding 4,5-dimethoxy-1,2-dimethylthiol by treatment with thiourea and proceeding as above, there is obtained 6,7-dimethoxy-2,3-benzodithian-2-oxide, m.p. 181°–183° C (benzene-hexane); and using 2,3-bis(chloromethyl)-1,4-naphthoquinone as the starting material, converting it to the corresponding dimethylthiol by treatment with potassium thiolacetate and proceeding as above there is obtained 1,4-dihydronaphtho[2,3-d]-o-dithiin-5,10-dion-2-oxide, m.p. 141°–142° C (dichloromethane-ether).

I claim:

1. 6,7-Dimethyl-2,3-benzodithian-2-oxide.

* * * * *

PO-1050
(5/69)

UNITED STATES PATENT OFFICE
CERTIFICATE OF CORRECTION

Patent No. 3,682,963      Dated August 8, 1972

Inventor(s) Kazimir Sestanj

It is certified that error appears in the above-identified patent and that said Letters Patent are hereby corrected as shown below:

In the Patent heading, insert

--[73] Assignee: Ayerst, McKenna and Harrison Limited, Ville St. Laurent, Quebec, Canada--

Column 4, line 26, "m.p. 00-100°C." should read --m.p. 99-100°C.--

Signed and sealed this 6th day of February 1973.

(SEAL)
Attest:

EDWARD M. FLETCHER, JR.
Attesting Officer

ROBERT GOTTSCHALK
Commissioner of Patents